United States Patent [19]
Van Thillo et al.

[11] 3,992,321
[45] Nov. 16, 1976

[54] ALUMINA BASED CATALYSTS AND PROCESS FOR PREPARING SUCH CATALYSTS

[75] Inventors: Hugo Johannes Van Thillo, Grimbergen; René Odon Lammers, Brussels; Henri Robert Debus, Meise; Raymond Marc Cahen, Brussels; Jacques Maurice Jules Ghislain André, Brussels, all of Belgium

[73] Assignee: Labofina S. A., Brussels, Belgium

[22] Filed: Feb. 10, 1975

[21] Appl. No.: 548,212

[30] Foreign Application Priority Data

Feb. 18, 1974 Luxemburg............................ 69403

[52] U.S. Cl. .............................. 252/429 R; 252/430; 252/439; 252/441; 252/442; 252/448; 252/463; 252/465; 252/466 J; 252/466 PT

[51] Int. Cl.² ........................................... B01J 37/00

[58] Field of Search ........... 252/448, 430, 439, 465, 252/466 J, 466 PT, 442, 441, 463, 429 R

[56] References Cited

UNITED STATES PATENTS

| 2,492,167 | 12/1949 | Marisic et al. ...................... 252/448 |
| 2,819,230 | 1/1958 | Strecker.............................. 252/465 |
| 3,120,495 | 2/1964 | Innes................................... 252/448 |
| 3,558,508 | 1/1971 | Keith ............................. 252/448 X |

Primary Examiner—Patrick P. Garvin

[57] ABSTRACT

A process for preparing spheroidal catalyst particles having an alumina support, which comprises polymerizing, in a substantially water-immiscible, hot fluid medium, an aqueous mixture which comprises alumina hydrogel, a compound capable of generating an active catalytic agent and a water soluble monomer whose uncross-linked polymer is water soluble or forms a gel, said aqueous mixture being dispersed in the form of droplets into the hot fluid medium wherein substantial polymerization of said monomer is performed.

12 Claims, No Drawings

ALUMINA BASED CATALYSTS AND PROCESS FOR PREPARING SUCH CATALYSTS

BACKGROUND OF THE INVENTION

The present invention relates to a process for preparing catalysts. More particularly, the present invention relates to a process for preparing catalysts in the form of beads, said beads comprising a catalytic agent and an alumina carrier. The present invention also relates to the catalysts so obtained.

Alumina is widely used as a constituent of industrial catalysts for converting hydrocarbons and various organic compounds. For most of such applications, catalysts in the form of spheroidal particles or beads preferably are used. Among the main advantages of such beads are better wear and crushing strength and a more regular distribution in the reactor which reduces the pressure drop of the reaction passing through the reactors. Generally, the bead type catalysts comprising a catalytic agent and an alumina carrier, are prepared by impregnating alumina beads with a catalytic agent or with a compound which generates this catalytic agent by thermal or chemical treatment.

Several processes have already been proposed for preparing spheroidal alumina particles. Such process comprises dispersing an alumina hydrosol as droplets, into a medium wherein gelation occurs and thereafter, subjecting the beads which are obtained in the form of alumina hydrogel, to one or more aging treatments in order to obtain beads having a suitable mechanical resistance. According to another process, an alumina hydrosol is mixed with an ammonium salt and a synthetic polymer or a natural gum. The mixture is then dispersed into a water-immiscible medium and thereafter subjected to an aging treatment. Alumina beads prepared by some of these processes contain high amounts, even excessive sometimes, of impurities which are undesirable when these beads are used as catalysts or catalyst supports.

An object of the present invention is to provide a new and simple method for preparing catalysts in the form of spheroidal particles, consisting of one or more catalytic agents and an alumina carrier.

Another object of the present invention is to provide a new process for preparing catalyst particles having catalytic activity not inhibited by impurities.

A further object of the present invention is to provide a process to obtain catalyst beads having an improved mechanical strength.

Additional objects will become apparent from the following description of the invention herein disclosed.

SUMMARY OF THE INVENTION

The present invention is a process for preparing spheroidal catalyst particles on an alumina support such process comprising polymerizing in a hot and practically water-immiscible fluid, an aqueous mixture which comprises alumina hydrogel, a compound capable of generating an active catalytic agent and a water soluble monomer whose uncross-linked polymer is water soluble or forms a gel, this mixture being dispersed as droplets into a hot fluid wherein substantial polymerization of the monomer occurs. More particularly, the process of the invention comprises producing an aqueous mixture which comprises alumina hydrogel, a compound capable of generating an active catalytic agent and a monomer as hereinabove defined, said aqueous mixture being dispersed in the form of droplets into a hot, practically water-immiscible fluid medium, substantially polymerizing said monomer contained in each droplet of said aqueous mixture, recovering beads therefrom consisting of alumina hydrogel and a compound capable of generating an active catalytic agent, agglomerated by the polymer, and drying and calcining said beads in order to obtain beads consisting essentially of alumina and a catalytic agent.

Another embodiment of the process of the invention comprises preparing an aqueous mixture containing from 5 to 29.95% by weight (based on aluminium oxide) of alumina hydrogel, 0.05 to 10% by weight of a compound capable of generating an active catalytic agent (based on catalytic constituent), the total amount of said hydrogel and said compound capable of generating an active catalytic agent not exceeding 30% by weight, 0.25 to 20% by weight of a water-soluble monomer with ethylenic unsaturation and whose uncross-linked polymer is water soluble or forms a gel, and 0.05 to 2% of a polymerization catalyst, dispersing said aqueous mixture, as droplets, into a water-immiscible fluid having a temperature of 50° to 105° C, at atmospheric pressure, maintaining said droplets in said fluid until beads are formed and become hard, and drying and calcining said beads.

DESCRIPTION OF THE PREFERRED EMBODIMENTS

In using the process of the present invention, the alumina hydrogel is used in a finely divided form to ensure an easy dispersion into the starting aqueous medium. Alumina hydrogel may be prepared by any known method, particularly by treating aluminium sulphate with a base, or by hydrolyzing isopropylate or any other aluminium alcoholate, or by treating an alkali aluminate with an acid or with aluminium sulphate. The alumina hydrogel precipitate obtained is washed with water several times and thereafter dried. The term "alumina hydrogel", as used herein, includes not only practically pure alumina hydrogel but also includes hydrogels containing a minor amount of silica or alkali silicate or similar materials.

The starting aqueous mixture must remain sufficiently free flowing at room temperature to allow ready dispersion thereof in the form of droplets into the polymerization zone which is the hot fluid. In order to avoid excessive investment and drying costs of the beads obtained by the process, too dilute solutions of the starting aqueous mixture are avoided. Preferably, the aqueous mixture which is used contain in a finely divided form, from 5 to 30% by weight of both alumina hydrogel (based on $Al_2O_3$) and compounds capable of generating active catalytic agents (based on catalytic constituents). In some cases, the alumina hydrogel may have a tendency to stiffen in the presence of water; this tendency to stiffening depending on hydrogel type, its method of preparing, its degree of purity and on the monomer type. However, this stiffening does not result from polymerization of the monomer. Premature stiffening may be avoided or at least inhibited by subjecting the aqueous mixture to vigorous agitation. The preferred aqueous mixtures used are those containing about 7.5 to 20% by weight of alumina hydrogel (based on $Al_2O_3$) and compounds capable of generating active catalytic agents (based on active catalytic constituents).

The compound capable of generating active catalytic agents introduced into the starting aqueous mixture may be in the form of either the agent itself, such as a metallic oxide or sulfide, or a metal, or may be a compound which gives such an active agent by thermal or chemical treatment. In other words, for preparing a catalyst which consists of alumina and cobalt oxide, either cobalt oxide may be used, or a cobalt salt such as cobalt chloride, acetate, carbonate or nitrate may be used followed by thermal treatment. When such a catalyst is desired containing alumina and catalytic metal, a compound of such metal is used. By way of example, rhenium chloride, chloroplatinic acid, platinum-tetramine chloride, $Pt(NH_3)_4 Cl_2$, ammonium palladium-chloride, $(NH_4)_2 Pd Cl_4$ and the like may be used in the process of the present invention. In order to obtain a catalyst in which the active catalytic agent is highly dispersed, a catalyst generating compound which is water soluble or which forms a gel or which forms a colloidal suspension preferably is used. A catalyst consisting of alumina and a catalytic metal may also be manufactured by preparing, according to the process of the present invention, alumina which contains metal oxide in a finely divided form and thereafter subjecting the mixture to hydrogenation according to known methods.

The amount of the compound capable of generating active catalytic agents introduced into the starting aqueous mixture depends on many factors such as desired catalyst type, the catalytic agent, etc. Such amount may vary between about 0.15 to 35% by weight, this amount being based on active catalytic agent in the end catalyst. The starting aqueous mixture must remain fluid at room temperature. Generally, the amount of catalytic agent generating compound does not exceed 10% and generally the total amount of alumina hydrogel (based on $Al_2O_3$) and catalytic agent generating compound (based on active catalytic agents) does not exceed 30% by weight of the aqueous mixture.

The water soluble monomer whose uncross-linked polymer is water soluble or forms a gel is selected from the group consisting of ethylenically unsaturated compounds comprising acrylic compounds of the general formula

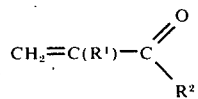

wherein $R^1$ is H or a methyl radical and $R^2$ is a $-OR^3$ or $-NR^3R^4$ radical with $R^3$ and $R^4$ in such radical being H or a hydrophilic radical, particularly a hydroxyalkyl radical containing from 1 to 2 carbon atoms or a methoxy methyl radical. Non-limiting examples of such compounds are acrylic acid, methacrylic acid, acrylamide, methacrylamide, N-hydroxymethylacrylamide, N-hydroxymethyl-methacrylamide, N-methoxymethylacrylamide, N-methoxymethyl-methacrylamide, ethyleneglycol monoacrylate, ethyleneglycol monomethacrylate and the like. The choice of the monomer depends primarily on economic conditions, and, for that reason, acrylic acid, methacrylic acid, acrylamide and mixtures thereof preferably are used. The term "water soluble monomer" and "water soluble uncross-linked polymer" also include ethylenically unsaturated monomers containing a major part of monomers whose uncross-linked polymers are water soluble and a minor part of monomers whose uncross-linked polymers are water-insoluble.

The amount of said water soluble monomer depends on many factors such as alumina hydrogel amount, amount and type of compound which generates the catalytic agent, monomer type, desired apparent density of the final beads, etc. Generally, the amount of said monomer is between 0.25 and 20% by weight of the aqueous mixture. It has been observed that the behavior of the beads obtained according to the process of the present invention depends on the respective amounts of alumina hydrogel and monomer. Preferably, the amount of said monomer used is in an amount corresponding to about 5 to 150% of the alumina hydrogel weight. Higher amounts of monomer may cause a disaggregation of the beads when such beads are subjected to calcination. Too low an amount results in the production of beads which are not very manipulatable and not very firm. In order to obtain catalyst beads which present after calcination, interesting properties with regard to density and mechanical strength, the aqueous mixture preferably used contains an amount of monomer corresponding to about 5 to 75% of the alumina hydrogel weight (based on aluminium oxide).

It has been found that by adding perchloric acid $HClO_4$ or nitric acid to the starting aqueous mixture, the catalyst beads have, after drying and calcining, a higher mechanical strength. The amount of such acid may vary between wide limits. Generally, this amount is between 0.5 and 10% by weight of the aqueous mixture, although amounts higher than 10% may be used without any significant improvements in results. It has been further determined that up to 50% of the perchloric or nitric acid may be substituted by another acid such as a halogenated acid, phosphoric acid, an aliphatic mono or dicarboxylic acid, substituted or unsubstituted. Among these acids which can be used in admixture with the perchloric or nitric acid, such acids as hydrochloric acid, formic acid, acetic acid, oxalic acid and trichloracetic acid are preferred, although the specific choice of such acid depends primarily on economic conditions. The terms "perchloric acid" and "nitric acid" used herein are meant to include the mixture of perchloric or nitric acid with the above mentioned additive acids.

The starting mixture is dispersed into a substantially water-immiscible fluid having a temperature between about 50° and 105° C at atmospheric pressure. Preferably, the aqueous mixture is introduced with the aid of calibrated orifices or nozzles in order to obtain a subdivision of said mixture in the form of droplets which are dispersed into the fluid. The residence time of the droplets in the fluid must be sufficient to permit the polymerization of the monomers. The water-immiscible fluid may be a gas, such as dry air, which is introduced into a tower in counter-current flow to the droplets of the starting aqueous mixture. Another advantageous embodiment of the invention is the use as such a fluid, a water-immiscible liquid. This liquid may have a density higher than that of the beads to be prepared. In such instance, the starting aqueous mixture is introduced as droplets at the bottom of a column containing the liquid and the beads formed and then recovered on the surface of the liquid. Another embodiment consists in using a liquid medium whose density is lower than that of the beads such as a mineral oil. A generally used such technique is described in U.S. Pat. No. 2,620,314. Such technique consists in using a column filled with hot oil in which droplets of an aqueous mixture are allowed to fall, the residence time of the droplets in the oil being sufficient to allow the polymerization of the polymer. Temperature of the liquid is at least equal to about 50° C in order to reduce the polymerization time. Temperatures higher than about 105°–110° C result in evaporation of water and a disaggregation of beads, unless the process is carried out under pressure. According to a preferred embodiment, the temperature of the water-immiscible liquid is between 75° and 100° C and the pressure at about atmospheric pressure.

In order to reduce the time needed for the beads to form, it is advantageous to use means for promoting the polymerization of the monomers. Free radical catalysis techniques with peroxidic compounds are quite useful, and particularly useful are the redox catalysis systems which consist of using as catalyst a combination of a peroxidic compound and a reducing agent. Persulphuric acid, hydrogen peroxide, perboric acid and their salts, particularly sodium, potassium or ammonium persulphates and the water soluble peracids, such as peracetic acid, are examples of useful peroxidic compounds. Reducing agents may be selected from the group consisting of sodium thiosulphate, sodium hyposulphite or dithionite, sodium or potassium bisulfite, N,N,N',N'-tetramethylethylene-diamine, sodium formaldehydrosulfoxylate, hydrazine, ascorbic acid, etc. A part of the reducing agent may be introduced into the starting aqueous mixture, the other part being added into the water-immiscible fluid in which the polymerization is performed to the extent such reducing agent is soluble in such fluid. It also may be added into the vessel in which the beads are recovered. The term "polymerization catalyst", as used herein, includes the peroxidic compound when this latter is used with or without reducing agent. The amount of polymerization catalyst may vary widely and depends on the content of inhibitors present in the monomer used. Generally, the amount of polymerization catalyst is between about 0.05 and 2% by weight of the aqueous mixture when the monomer is substantially free of inhibitors.

The mixture subjected to polymerization may contain a cross-linking agent which has functional groups so that the polymer chains are linked together and form a three dimensional structure. Cross-linking agents may be 1,3-di(acryl- or methacryl-amidomethyl)-2-imidazolidone, hexahydrotriacryloyl-triazine, N,N'-methylidene-bis-acrylamide and alkylidene-bis-acrylamides, such as N,N'-methylene-bis-acrylamide and N,N'-ethylidene-bis-acrylamide when the acrylic monomer used has an amide group, an aldehydic compound may be used as cross-linking agent, such as formaldehyde and glyoxal. Glyoxal reacts with a part of acrylamide to form N,N'-dihydroxyethylene-bis-acrylamide. It is not necessary to add a cross-linking agent when the acrylic monomers are in an acid medium, but it may be useful to reduce attrition of the beads. The amount of cross-linking agent does not generally exceed 1% by weight of the aqueous mixture, although higher amounts may be used, but without any significant advantage.

According to the process of the present invention, the beads obtained from the fluid polymerization zone are dried at a temperature of about 110° C and then calcined by progressively increasing the temperature up to about 400° to 800° C and preferably 500° to 700° C.

The process of the present invention is very flexible and permits preparation of a wide variety of catalysts containing one or more active catalytic agents, by introducing into the starting aqueous mixture one or more of these agents or compounds capable of generating catalytic agents. According to another embodiment of the process of the invention, one of these agents or one of such compounds is introduced into the starting aqueous mixture, the beads obtained then impregnated, wet or dried, or dried and calcined, with another catalytic agent or another compound capable of generating another catalytic agent. By either method, after calcination, a catalyst in the form of beads is obtained, which consists of a solid agglomerate consisting of an alumina carrier and one or more catalytic agents. The catalysts so obtained are suitable for heterogeneous catalytic reactions wherein the catalyst must have a high mechanical and thermal strength.

The following examples are presented to illustrate the present invention but are not to be considered limiting. Except as otherwise specifically stated, the percentages indicated in the examples are expressed by weight. In the examples, the mechanical resistance of the beads is expressed by the crushing resistance measured with the Tablet Hardness Tester apparatus (of Manestry Machines, Ltd., Liverpool, Great Britain) in which the bead is placed between two plates, one of which is fixed and the other moves for increasing weight on the bead. The values given in the examples are the average values of experiments performed on five beads.

EXAMPLE

Alumina hydrogel was produced by treating aluminium sulphate with caustic soda up to pH 9. The gel obtained was waterwashed, dried at 110° C, crushed and sieved. Next an aqueous mixture was prepared, having the composition: alumina hydrogel, 14.7% (based on $Al_2O_3$); molybdenium oxide, 1.47%; perchloric acid, 3.4%; acrylic acid, 1.93%; dihydroxy-ethylene-bis-acrylamide, 0.096%; ammonium persulphate, 0.44%; and sodium bisulphite, 0.044%. By applying a low pressure, this aqueous mixture was introduced dropwise into a column containing a paraffinic oil ($d_{15}^4$ : 0.83) heated to 95° C. Beads were recovered from the column and were aged in an aqueous ammonium solution, dried at 110° C and calcined at 650° C. The resulting beads, the greater part of which had a diameter of between 1 and 2 mm, were alumina based, and contained 9.85% of molybdenum oxide. These beads had a crushing strength of 6 kg. In the presence of this catalyst, a gasoline fraction was treated at a temperature of 550° C, under a pressure of 3.5 kg/cm2 and with an hourly by space velocity of 1. The following results were obtained:

|  | Before treating | After treating |
|---|---|---|
| Boiling | 75° – 245° C | 46° – 220° C |
| Octane index (with 3 cc of lead tetraethyl) | 69 | 82 |

EXAMPLE 2

The procedure described in Example 1 was repeated, with a starting aqueous mixture having the composition: alumina hydrogel, 15% (based on $Al_2O_3$; molybdenium oxide, 2.48%; perchloric acid, 2.1%; acrylic acid, 0.55%; acrylamide, 0.25%; N,N'-ethylidene-bis-acrylamide, 0.04%; ammonium persulphate, 0.3%; and sodium bisulphite, 0.03%. The beads obtained were calcined and used to reform gasoline as described in Example 1. The produce obtained also had an octane index of 82.

EXAMPLE 3

An aqueous mixture was prepared having the composition: alumina hydrogel, 21% (based on $Al_2O_3$); chromium oxide, 3.4%; perchloric acid, 4.3%; acrylamide, 2.8%; ethyleneglycol monomethacrylate, 0.4%; glyoxal, 0.4%; ammonium persulphate, 0.94%; and sodium formaldehyde-sulfoxylate, 0.1%. This mixture was injected dropwise at the bottom of a column containing Phenoclor DP4 (chlorinated diphenyl sold by PROGIL S. A. and having a density of 1.39 at 100° C) at a temperature of 93° C. The beads were recovered on the surface of the liquid. The beads obtained consisted of alumina and 14.9% of chromium oxide. Dehydrogenation of butane was performed in the presence of this catalyst, at a temperature of 550° C. n-butene was obtained with a yield of 30.7 mole %.

EXAMPLE 4

The procedure of Example 1 was repeated, but chromium nitrate $Cr(NO_3)_3 \cdot 9H_2O$ was used as the compound capable of generating the catalytic agent. The catalyst obtained contained alumina and 5% by weight of $Cr_2O_3$. This catalyst is found to be active in the dehydrogenation of butane into n-butene.

EXAMPLE 5

A series of experiments were performed as in Example 1 except by using different aqueous mixtures containing 15% alumina hydrogel (based on $Al_2O_3$) and 1.5% $TiO_2$, and variable amounts of acrylic acid, perchloric acid and polymerization catalyst. The amount of cross-linking agent (dihydroxy-ethylene-bis-acrylamide) was equal to 5% of the acrylic acid weight. The catalyst consisted of ammonium persulphate and sodium bisulphite in a weight ratio of 10 : 1. The beads formed were dried and calcined. After these two operations, the beads had the characteristics indicated in Table I below. These catalyst beads were found to be useful in isomerizing heptene into isoheptene at 450° C.

TABLE I

| Acrylic acid (% by weight) | Perchloric acid (% by weight) | Catalytic mixture (% by weight) | Characteristics of the beads | |
|---|---|---|---|---|
| | | | Apparent density | Crushing Strength(kg) |
| 0.5 | 1.0 | 0.5 | 0.87 | 11.2 |
| 0.5 | 1.7 | 0.6 | 0.76 | 8.2 |
| 1.0 | 1.7 | 0.7 | 0.75 | 8.5 |
| 17.5 | 3.6 | 0.1 | 0.86 | 6.7 |
| 5.3 | 3.5 | 0.06 | 0.82 | 9.8 |

EXAMPLE 6

An aqueous mixture was prepared having the composition: alumina hydrogel, 15.5% (based on $Al_2O_3$); germanium tetrachloride, 0.35%; acrylic acid, 0.51%; dihydroxyethylene-bis-acrylamide, 0.025%; $HClO_4$, 0.55%; HCl, 0.30%; ammonium persulphate, 0.38%; and sodium bisulphite, 0.038%. The procedure of Example 1 was repeated. After drying and calcining, the beads obtained contained 1% by weight of $GeO_2$, had an apparent density of 0.73 g/ml and a crushing strength of 9.1 kg. Thereafter these beads were impregnated with chloroplatinic acid. The beads obtained contained 0.7% by weight of platinium. These beads were found to be useful as catalyst for reforming naphtha.

EXAMPLE 7

An aqueous mixture, similar to that of Example 6 was prepared, but with 1.5% of acrylic acid and without cross-linking agent. The characteristics of the calcined alumina beads containing $GeO_2$ were an apparent density of 0.64 g/ml and a crushing strength of 8.7 kg.

EXAMPLE 8

An aqueous mixture was prepared having the composition: alumina hydrogel, 10.5% (based on $Al_2O_3$); molybdenium oxide, 1.65%; methacrylic acid free of inhibitor, 7.5%; dihydroxy-ethylene-bis-acrylamide, 0.375%; perchloric acid, 2%; ammonium persulphate, 0.7%; and sodium bisulphite, 0.07%. This mixture was injected dropwise into a column containing oil heated at 102° C. After recovery of the beads formed, drying and calcining, the beads had an apparent density of 0.73 g/ml. These catalyst beads contained $Al_2O_3$ and 14.2% of $MoO_3$ and were found useful in reforming gasoline.

EXAMPLE 9

An aqueous mixture was prepared having the composition: alumina hydrogel, 20% (based on $Al_2O_3$); molybdenium oxide, 3.2%; N-hydroxymethyleneacrylamide, 3.8%; dihydroxyethylene-bis-acrylamide, 0.19%; perchloric acid, 3%; ammonium persulphate, 0.6%; and sodium bisulphite, 0.06%. This mixture was injected dropwise into a column containing oil heated at 92° C. The beads formed were waterwashed, dried and calcined. The characteristics of the calcined beads were an apparent density of 0.90 g/ml and a crushing strength of 4.9 kg. These catalyst beads were found useful for reforming gasoline.

EXAMPLE 10

An aqueous mixture was prepared having the composition: alumina hydrogel, 15% (based on $Al_2O_3$); iron oxide $Fe_2O_3$, 1.75%; acrylic acid, 0.52% acrylonitrile, 0.48%; dihydroxy-ethylene-bis-acrylamide, 0.05%; perchloric acid, 1.8%; ammonium persulphate, 0.6%; and sodium bisulphite, 0.06%.

This mixture was injected dropwise into a column containing oil heated at 95° C. After calcination, the beads recovered from the column had an apparent density of 0.87 g/ml and a crushing strength of 10.9 kg. The beads consisted of $Al_2O_3$ containing 9.8% of $Fe_2O_3$. These beads were impregnated with a solution containing ammonium heptamolybdate and cobalt nitrate. Thereafter the beads were dried and calcined at 575° C. Beads containing 9% by weight of molybdenium oxice and 3% by weight of cobalt oxide were obtained. These catalyst beads were found useful as catalysts for hydrorefining lubricating base oils.

EXAMPLE 11

Example 10 was repeated except that the catalyst prepared consisted of $Al_2O_3$ containing 28% of $Fe_2O_3$ by using an aqueous mixture containing 2.22% of $Fe(NO_3)_3 \cdot 9H_2O$.

EXAMPLE 12

Example 10 was repeated except that no perchloric acid was used. After calcination, the catalyst beads obtained consisted of alumina containing 9.8% of $Fe_2O_3$ and had an apparent density of 0.8 g/ml.

EXAMPLE 13

A series of experiments were performed according to the procedure of Example 1 except, instead of molybdenium oxide, cobalt oxide CoO, cobalt chloride $CoCl_2$ and cobalt nitrate $Co(NO_3)_2$ were included. After calcination, alumina beads containing 9% of CoO was obtained in each experiment. The catalysts were found useful for hydrogenating pyridine into piperidine at 150° C and 200 atmospheres.

EXAMPLE 14

The procedure of Example 1 was repeated except that a mixture of zinz hydroxide and chromium nitrate was substituted for the molybdenium oxide. After calcination, the beads consisted of alumina containing zinc oxide and chromium oxide in a molar ratio ZnO to $Cr_2O_3$ of 1 : 1. This catalyst was found useful for methanol synthesis from CO and $H_2$.

EXAMPLE 15

The procedure of Example 1 was repeated except that nickel oxide was substituted for molybdenium oxide. After calcination, the beads obtained consisted of alumina containing 10% of NiO. These beads were subjected to a reduction treatment with hydrogen at a temperature of 470° C. The beads obtained consisted of alumina containing finely dispersed nickel. These catalyst beads were found useful for hydrogenating benzene into cyclohexane.

EXAMPLE 16

The procedure of Example 1 was repeated, except that cupper oxide CuO was substituted for molybdenium oxide to obtain beads which, after calcination, consisted of $Al_2O_3$ containing 10% of CuO. These beads were found useful for eliminating oxygen traces from gas streams.

EXAMPLE 17

Alumina hydrogel was prepared by hydrolizing aluminium isopropylate. Thereafter the precipitate was dried at 110° C. 4.0 g. of this alumina hydrogel (with 26% water) were mixed with 2.0 g. of a 3.04% sodium silicate solution, 20.8 g. of water and 0.26 ml of a 70% perchloric acid solution. After 15 minutes, 0.94 ml of a solution containing 63.5% of acrylic acid and 3.17% of dihydroxyethylene-bis-acrylamide was added. 0.12 ml of an aqueous solution containing 10% of ammonium persulphate and 0.42 ml of a 2% sodium bisulphite solution was then added. This mixture was injected dropwise into a column containing oil heated at 95° C. Beads were recovered, washed and calcined. The beads obtained had a crushing strength of 4.8 kg and consisted of $Al_2O_3$ (98.2%) and $SiO_2$ (1.8%). This catalyst was found useful for isomerizing 2,2-dimethyl-butane into 2,3-dimethyl-butane.

EXAMPLE 18

The procedure of Example 1 was repeated except that an aqueous mixture was used having the composition: alumina hydrogel, 20% (based on $Al_2O_3$); acrylamide, 5.2%; glyoxal, 0.25%; perchloric acid, 3.6%; chloroplatinic acid, 0.15%; ammonium persulphate, 0.57%; and sodium bisulphite, 0.057%. Beads were recovered at the bottom of the column, waterwashed, aged in isopropanol for 3 hours and thereafter dried at 110° C and calcined at 700° C. These beads which consisted of $Al_2O_3$ containing 0.3% of platinum, were used for catalytic reforming of naphtha at a temperature of 550° C and under a pressure of 3.5 kg/cm2. The following results were obtained:

|  | Before reforming | After reforming |
|---|---|---|
| Boiling rante | 130 – 195° C | 78 – 210° C |
| Octane index with 3 cc of lead tetraethyl | 71 | 91 |

EXAMPLE 19

The procedure of Example 18 was repeated except that 0.3% of rhodium chloride $RhCl_3 \cdot \times H_2O$ (38.55% Rh) was used. Alumina beads containing 0.70% Rh were obtained. These catalyst beads were used for dehydroisomerizing methylcyclopentane into benzene.

What is claimed is:

1. A process for preparing spheroidal catalyst particles having an alumina support, which comprises polymerizing, under thermal polymerization conditions or under catalytic polymerization conditions employing free radical catalyst techniques, in a substantially water-immiscible, hot fluid medium, an aqueous mixture which comprises 5% to 30% by weight of alumina hydrogel, 0.15 to 35% by weight of a compound capable of generating an active catalytic agent by thermal or chemical treatment and 0.25 to 20% by weight of a water soluble monomer whose uncross-linked polymer is water soluble or forms a gel, said monomer being one selected from the group consisting of acrylic compounds of the general formula:

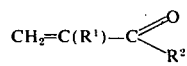

wherein $R^1$ is H or a methyl radical and $R^2$ is a $-OR^3$ or $-NR^3R^4$ radical in which $R^3$ and $R^4$ are H or a hydrophilic radical, said aqueous mixture being dispersed in the form of droplets into the hot fluid medium wherein substantial polymerization of said monomer is performed.

2. A process for preparing catalyst beads comprising producing an aqueous mixture which comprises 5 to 30% by weight of alumina hydrogel, 0.15 to 35% by weight of a compound capable of generating an active catalytic agent by thermal or chemical treatment and 0.25 to 20% by weight of a water soluble monomer whose uncross-linked polymer is water soluble or forms a gel, said monomer being one selected from the group consisting of acrylic compounds of the general formula:

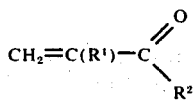

wherein $R^1$ is H or a methyl radical and $R^2$ is a $-OR^3$ or $-NR^3R^4$ radical in which $R^3$ and $R^4$ are H or a hydrophilic radical, dispersing said aqueous mixture in the form of droplets into a substantially water-immiscible hot fluid medium, substantially polymerizing said monomer contained in each droplet of said aqueous mixture under thermal polymerization conditions or under catalytic polymerization conditions employing free radical catalysts techniques, recovering beads from said hot fluid medium, said beads consisting essentially of alumina hydrogel and said compound capable of generating an active catalytic agent, agglomerated by the polymer, drying and calcining said beads to obtain beads consisting of alumina and a catalytic agent.

3. A process for preparing catalyst beads which comprises preparing an aqueous mixture comprising from 5 to 29.95% by weight (based on aluminium oxide) of alumina hydrogel, 0.05 to 10% by weight of a compound capable of generating an active catalytic agent by thermal or chemical treatment (based on catalytic agent), the total amount of hydrogel and said compound capable of generating a catalytic agent not exceeding 30% by weight, 0.25 to 20% by weight of a water soluble monomer whose uncross-linked polymer is water soluble or forms a gel, said monomer being one selected from the group consisting of acrylic compounds of the general formula:

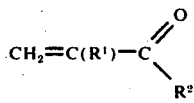

wherein $R^1$ is H or a methyl radical and $R^2$ is a $-OR^3$ or $-NR^3R^4$ radical in which $R^3$ and $R^4$ are H or a hydrophilic radical, and 0.05 to 2% by weight of a free radical polymerization catalyst, dispersing said aqueous mixture, in the form of droplets, into a water-immiscible fluid medium having a temperature of 50 to 105° C at atmospheric pressure, maintaining the droplets in this fluid medium until beads are formed and become hard, drying and calcining said beads.

4. The process of claim 1 wherein said monomer is used in an amount corresponding to 5 to 150% of the alumina hydrogel (based on $Al_2O_3$) used.

5. The process of claim 1 wherein said aqueous mixture contains about 7.5 to 20% by weight of alumina hydrogel.

6. The process of claim 1 wherein said aqueous mixture contains from 0.5 to 10% by weight of perchloric acid.

7. The process of claim 6 wherein said perchloric acid is used in admixture with an amount up to 50% of a phosphoric acid, nitric acid, hydrochloric acid, formic acid, acetic acid, oxalic acid and trichloroacetic acid.

8. The process of claim 1 wherein said alumina hydrogel contains a minor amount of silica or alkali silicate.

9. The process of claim 1 wherein said polymerization of the aqueous mixture is performed by dispersing the aqueous mixture in the form of droplets and injecting these droplets into counter-current flow with a dry hot gas.

10. The process of claim 1 wherein said polymerization of said aqueous mixture is performed by dispersing said aqueous mixture in the form of droplets at the bottom of a column containing a liquid having a density higher than that of the beads formed, and recovering said beads from the surface of said liquid.

11. The process of claim 1 wherein said polymerization of said aqueous mixture is performed by dispersing said aqueous mixture in the form of droplets at the head of a column containing a liquid having a density lower than that of the beads formed and recovering said beads at the bottom of said column.

12. The process of claim 1 wherein said beads which are constituted of an alumina support and an active catalytic agent, are then impregnated with at least one other compound capable of generating an active catalytic agent by thermal or chemical treatment.

* * * * *